N. Richardson,
Fish Cutter or Bait Mill.
Nº 35,472. Patented June 3, 1862.
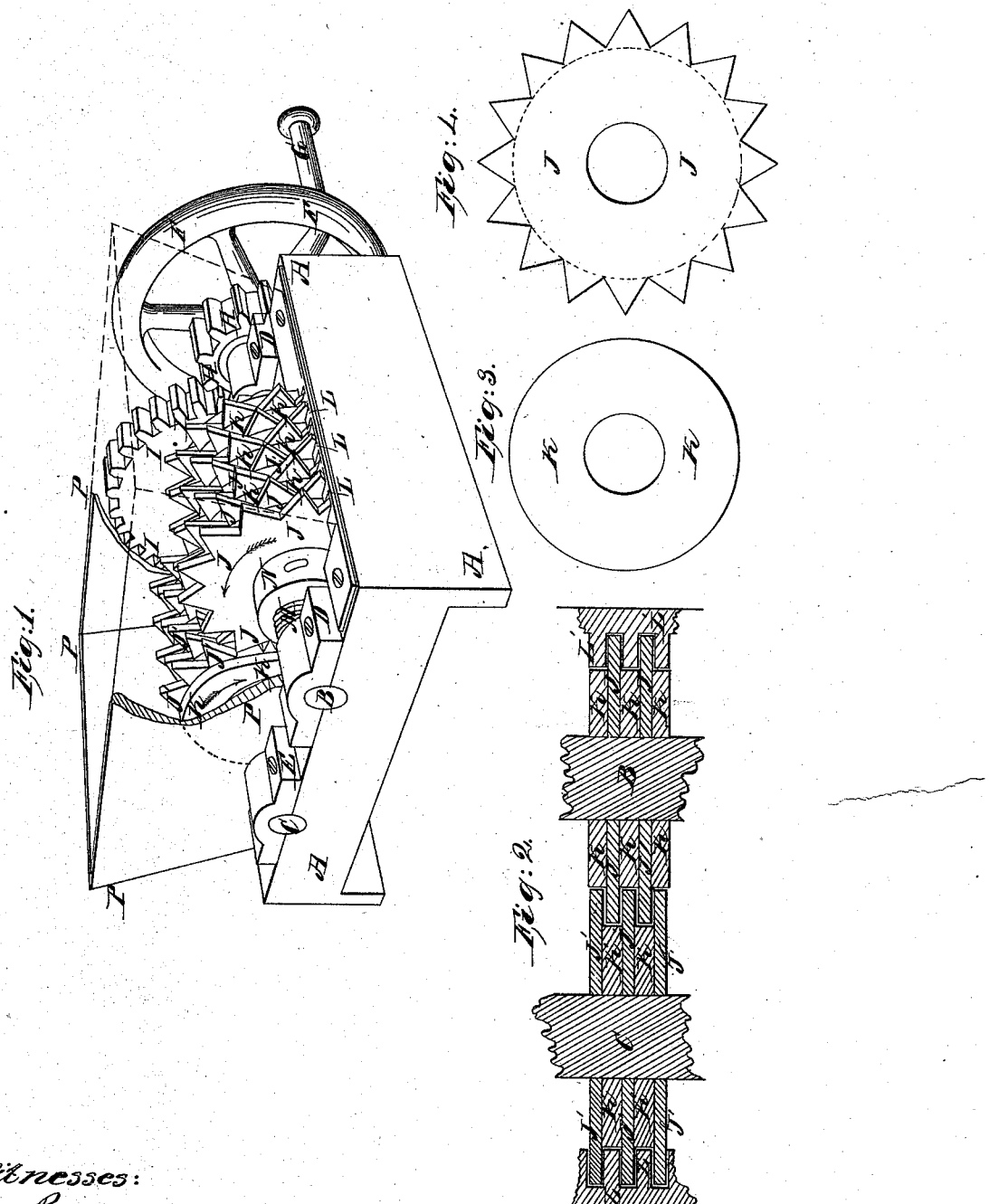
Witnesses:
Ebenezer Page
Cyrus Story
Inventor:
Nathan Richardson

UNITED STATES PATENT OFFICE.

NATHAN RICHARDSON, OF GLOUCESTER, MASSACHUSETTS.

IMPROVED FISH-CUTTER OR BAIT-MILL.

Specification forming part of Letters Patent No. 35,472, dated June 3, 1862.

*To all whom it may concern:*

Be it known that I, NATHAN RICHARDSON, of Gloucester, in the county of Essex and State of Massachusetts, have invented an Improvement in Bait-Mills; and I do hereby declare that the following is a full and exact description thereof, reference being had to the accompanying drawings, and to the letters and figures marked thereon.

The machines now in common use for cutting fish-bait consist of a single cylinder armed with double-edged knives which play between fixed knives attached to the frame, the cylinder being turned by a crank and the fish to be cut fed in from a hopper. The objections to this machine are that it is difficult to keep the knives sharp, and when they are dull the mill becomes clogged and is difficult to turn. The knives are easily broken, and large pieces of fish pass through. Thus the porgee or other fish used for bait is very imperfectly prepared, while it is desirable that it be made as fine as possible.

Clam-bait cannot be prepared by the common machine, as the openings between the knives are necessarily large, and the clams slip through without being cut. As clam-bait is worth twice as much as common fish-bait, it is very important that it be ground fine, for in this condition a much less quantity suffices to make the fish bite when it is thrown into the water.

Another reason for grinding the bait fine and of uniform size is that mackerel and many other fish will bite at the largest pieces, and these they find on the hook.

My machine is shown in Figure I in perspective. Fig. II is a horizontal section through the shafts, cutters, and washers. Fig. III is a plan of one of the washers or collars. Fig. IV is a plan of one of the cutters.

The frame A is made in such a form that it may be readily fitted to the top of a barrel when in use, and at its upper edges support the two horizontal parallel shafts B and C, which have their bearings D and E in the sides of the frame.

To the shaft B a fly-wheel and handle, F G, are attached, and also a spur-gear, H, which drives the gear I, that is attached to the other shaft, C. These gears, and also the crank and fly-wheel, project beyond the outside of the frame.

Within the frame are the cutters and washers or collars, which are made of cast-iron, in the form represented in Figs. III and IV.

The washers K may be about one-fourth of an inch thick. They have a hole at the center to receive the shaft B or C.

The cutters J are not quite so thick as the washers, and this allows their teeth to play freely between each other, as represented in Fig. II.

The teeth are triangular in form, and the periphery of the washers is at the base of the teeth, as shown in Fig. IV.

The whole length of the shaft within the frame may be about ten or twelve inches, and the cutters and washers fill this whole space, being slipped onto the shaft B or C alternately—first a cutter and then a washer, as shown in Fig. II.

The cutters are set spirally with each other, as in Fig. I, and are held firmly in place by the nut N, which turns upon the screw M, cut upon the shaft.

As the shaft B is turned the teeth play between each other and in opposite directions at the center of the machine, and at the sides they play between the comb-shaped bars L L', which assist in keeping the teeth clean as they pass upward.

The gear H has a less number of teeth than the gear I, thus giving a slower motion to the cutters on the shaft C than on the shaft B. This causes the cutters upon that shaft to act as feeders, bringing forward the fish that is to be ground with a slow movement, while at the same time the different velocity of the cutters causes a grinding as well as a cutting action, and this combined feeding, cutting, and grinding makes the bait fine and of uniform size.

A small hopper, P, is fitted to the frame A, to receive the fish or clams that are to be cut, and it will be observed that these cannot pass through without being thoroughly divided, as the cutters fit very close where they pass between each other at the center of the machine, and also at the sides, between the racks L L.

One of the shafts B or C may be mounted on sliding bearings, so that the cutters may be moved out or in, if desirable.

What I claim as my improvement in bait-mills is—

The combination of the series of triangular teeth J, acting as cutters, with the opposite series of triangular teeth, J', acting both as cutters and feeders, with the washers K, substantially as herein described, for the purpose specified.

NATHAN RICHARDSON. [L. S.]

In presence of—
 EBENR. PAGE,
 CYRUS STORY, Jr.